US011677613B2

(12) United States Patent
Triplet et al.

(10) Patent No.: US 11,677,613 B2
(45) Date of Patent: *Jun. 13, 2023

(54) ROOT-CAUSE ANALYSIS AND AUTOMATED REMEDIATION FOR WI-FI AUTHENTICATION FAILURES

(71) Applicant: Ciena Corporation, Hanover, MD (US)

(72) Inventors: Thomas Triplet, Manotick (CA); Arslan Shahid, Stittsville (CA); Bruck Wubete, Nepean (CA); Yogeshwar Chatur Deore, Pune (IN); Saurabh Dinesh Brahmankar, Pune (IN); Sudhan Puranik, Pune (IN); Dirk Tempel, Nepean (CA)

(73) Assignee: Ciena Corporation, Hanover, MD (US)

(*) Notice: Subject to any disclaimer, the term of this patent is extended or adjusted under 35 U.S.C. 154(b) by 31 days.

This patent is subject to a terminal disclaimer.

(21) Appl. No.: 17/241,429

(22) Filed: Apr. 27, 2021

(65) Prior Publication Data
US 2022/0294686 A1 Sep. 15, 2022

(30) Foreign Application Priority Data

Mar. 15, 2021 (IN) ............... 202111010810

(51) Int. Cl.
H04W 24/08 (2009.01)
H04L 41/0631 (2022.01)
H04W 12/37 (2021.01)
H04W 24/04 (2009.01)
H04W 84/12 (2009.01)

(52) U.S. Cl.
CPC ......... *H04L 41/0636* (2013.01); *H04W 12/37* (2021.01); *H04W 24/04* (2013.01); *H04W 24/08* (2013.01); *H04W 84/12* (2013.01)

(58) Field of Classification Search
CPC ......... H04L 12/28; H04L 12/50; H04W 24/08
USPC ........................................ 370/329
See application file for complete search history.

(56) References Cited

U.S. PATENT DOCUMENTS

| 10,171,161 | B1 | 1/2019 | Côté et al. |
| 10,841,181 | B2 | 11/2020 | Côté et al. |
| 11,200,130 | B2* | 12/2021 | Tankersley ....... G06Q 10/06393 |
| 2018/0248905 | A1 | 8/2018 | Côté et al. |
| 2019/0138948 | A1 | 5/2019 | Janulewicz et al. |
| 2019/0280942 | A1 | 9/2019 | Côté et al. |
| 2019/0303726 | A1 | 10/2019 | Côté et al. |
| 2019/0356553 | A1* | 11/2019 | Mermoud ............ G06K 9/6282 |
| 2020/0082013 | A1 | 3/2020 | Triplet et al. |
| 2020/0259700 | A1 | 8/2020 | Bhalla et al. |

(Continued)

*Primary Examiner* — Dang T Ton
(74) *Attorney, Agent, or Firm* — Clements Bernard Walker; Christopher L. Bernard

(57) ABSTRACT

Systems and methods for analyzing root-causes of Wi-Fi issues in a Wi-Fi system associated with a Local Area Network (LAN) are described in the present disclosure. A method, according to one embodiment, includes a step of monitoring a Wi-Fi system associated with a LAN to detect authentication failures in the Wi-Fi system. In response to detecting an authentication failure in the Wi-Fi system, the method also includes the step of analyzing the authentication failure to determine one or more root-causes of the authentication failure. The method also includes pushing changes to the Wi-Fi system to automatically remediate the one or more root-causes in the Wi-Fi system.

17 Claims, 7 Drawing Sheets

(56) References Cited

U.S. PATENT DOCUMENTS

| | | |
|---|---|---|
| 2020/0259717 A1 | 8/2020 | Ong et al. |
| 2020/0287788 A1 | 9/2020 | Triplet et al. |
| 2021/0028973 A1 | 1/2021 | Côté et al. |

* cited by examiner

| ROOT CAUSES |
|---|
| Insufficient Information |
| Login failed. Wrong user credentials. Username incorrect. |
| Login failed. Wrong user credentials. Password incorrect. |
| Configuration mismatch. Service categorization failed. |
| Successful login. |

|   | A | B | C | D | E |
|---|---|---|---|---|---|
| A | 1<br>20.00% | 0<br>0.00% | 0<br>0.00% | 0<br>0.00% | 0<br>0.00% |
| B | 0<br>0.00% | 1<br>20.00% | 0<br>0.00% | 0<br>0.00% | 0<br>0.00% |
| C | 0<br>0.00% | 0<br>0.00% | 1<br>20.00% | 0<br>0.00% | 0<br>0.00% |
| D | 0<br>0.00% | 0<br>0.00% | 0<br>0.00% | 1<br>20.00% | 0<br>0.00% |
| E | 0<br>0.00% | 0<br>0.00% | 0<br>0.00% | 0<br>0.00% | 1<br>20.00% |

TRUE LABEL (rows) / PREDICTED LABEL (columns)

A = Configuration mismatch. Service categorization failed.
B = Insufficient Information.
C = Login failed. Wrong user credentials. Entered password is incorrect.
D = Login failed. Wrong user credentials. Entered username is incorrect.
E = Successful login.

FIG. 7A

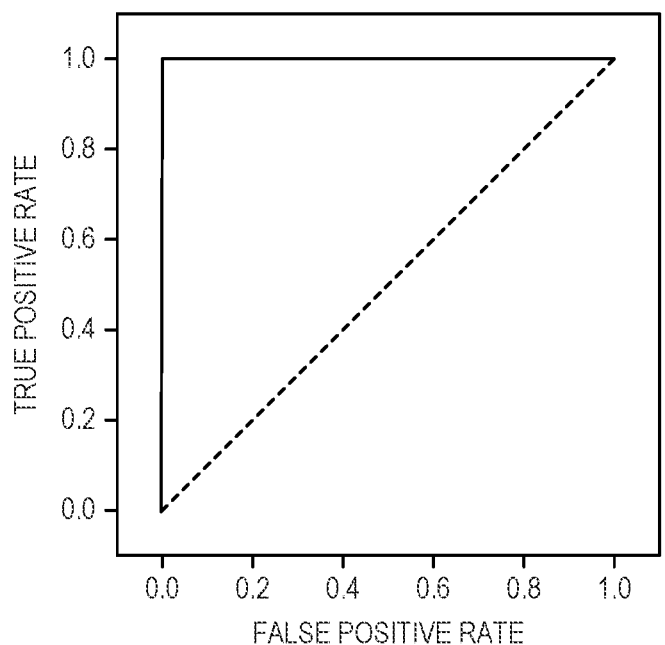

FIG. 7B

ROOT-CAUSE ANALYSIS AND AUTOMATED REMEDIATION FOR WI-FI AUTHENTICATION FAILURES

TECHNICAL FIELD

The present disclosure generally relates to networking systems and methods. More particularly, the present disclosure relates to detecting authentication failures in a Wi-Fi system to determine and remediate root-causes.

BACKGROUND

In enterprise networks, Wi-Fi is often set up for enabling wireless connectivity and access to a network (e.g., a Local Area Network (LAN), a Wide Area Network (WAN), the Internet, etc.). Multiple types of devices are involved in a Wi-Fi system to fulfill end-to-end network services. Within the Wi-Fi system, authentication services use common practices to ensure users, clients, devices, etc. are properly authenticated. These authentication services may be made via centralized identity management systems and access service management systems.

At present, different types of network devices are used in the Wi-Fi system to successfully authenticate an individual user. Some of these network devices may include Access Points (APs), wireless controllers (e.g., Wireless LAN Controllers (WLC)), identity service engines, policy mangers, etc. If an authentication fails, it may be necessary to check all syslog data from each network element and then utilize this syslog data to identity an exact root-cause of this error. Of course, this process can be time-consuming and may require a great deal of human effort. Once a root-cause is identified, remedial actions can be taken to fix the authentication issue, which again can require much time and effort by an individual.

There may be several processes that require a large amount of human time and effort to identify and remediate Wi-Fi issues. For example, some time-consuming and effort-consuming chores may include a) the collection of syslog data needed from each network devices, 2) the co-relation discovery process to find out the relationship of each syslog data point with respect to network devices against required timestamps to check which one fails authentication services and for which reasons, and 3) the remedial action, where, after completion of the co-relation discovery process, a human may need to take remedial action to fulfill the authentication service, which may require configuration changes in the network devices, and others. All of these steps to find out the exact root-cause analysis are time-consuming. Therefore, there is a need in the field of root-cause analysis to overcome the above-noted deficiencies in the conventional systems.

BRIEF SUMMARY

The present disclosure is directed to analysis systems, methods, and non-transitory computer-readable media for performing root-cause analysis of Wi-Fi issues. According to one implementation, an analysis system includes a network interface arranged in communication with a Wi-Fi system that is associated with a Local Area Network (LAN). The analysis system also includes a processing device and a memory device configured to store a computer program having instructions. When executed, the instructions enable the processing device to monitor the Wi-Fi system to detect authentication failures in the Wi-Fi system. In response to detecting an authentication failure in the Wi-Fi system, the instructions further enable the processing device to analyze the authentication failure to determine one or more root-causes of the authentication failure. Then, the processing device is configured to push changes to the Wi-Fi system to automatically remediate the one or more root-causes in the Wi-Fi system.

Furthermore, the analysis system may be configured such that the instructions, when executed, further enable the processing device to automatically remediate the one or more root-causes using a closed-loop automation process. For example, monitoring the Wi-Fi system may include collecting data in the Wi-Fi system and streaming the data to a message bus. The collected data may be related to symptoms indicative of issues in the Wi-Fi system. Monitoring the Wi-Fi system may include computing distances between the symptoms and a set of diagnostics, whereby the computed distances may correspond to dissimilarities between the symptoms and each of the diagnostics. The step of analyzing the authentication failure to determine the one or more root-causes may further include filtering the symptoms based on confidence thresholds to obtain one or more paths and then ranking the one or more paths based on the computed distances of the one or more paths. The step of pushing the changes to the Wi-Fi system to automatically remediate the one or more root-causes may further include remediating a root-cause for a highest-ranked path having the lowest computed distance before remediating one or more other root-causes.

In addition, the analysis system may further be defined whereby analyzing the authentication failure in the Wi-Fi system includes utilizing a hierarchical root-cause analysis tree having multiple levels to determine the one or more root-causes. Automatically remediating the one or more root-causes may include creating an incident request in an Information Technology Service Management (ITSM) system, creating a change implementation request, and, upon approval of the change implementation request by a change management system, applying the implementation request to the Wi-Fi system. The Wi-Fi system may include one or more of a user device, an Access Point (AP), a Wireless LAN Controller (WLC), a Network Access Control (NAC) device, a policy manager, and a directory service device. Monitoring the Wi-Fi system may include obtaining syslog data from the WLC and NAC device, pre-processing the syslog data, and applying the pre-processed syslog data to a Machine Learning (ML) training system. The step of pre-processing the syslog data may include utilizing one or more text searching techniques. The syslog data may be related to Performance Monitoring (PM) data, alarms, and syslog messages. The authentication failure in the Wi-Fi system may include one or more of a wrong username error, a wrong password error, and a configuration mismatch. Also, the LAN may be part of an enterprise system.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 7A is a confusion matrix illustrating an evaluation of the performance of a classifier, according to various embodiments of the present disclosure.

FIG. 7B is a graph illustrating a Receiver Operating Characteristic-Area Under the Curve (ROC-AUC) plot illustrating the performance of a ML model, according to various embodiments of the present disclosure.

DETAILED DESCRIPTION

Figure 1:
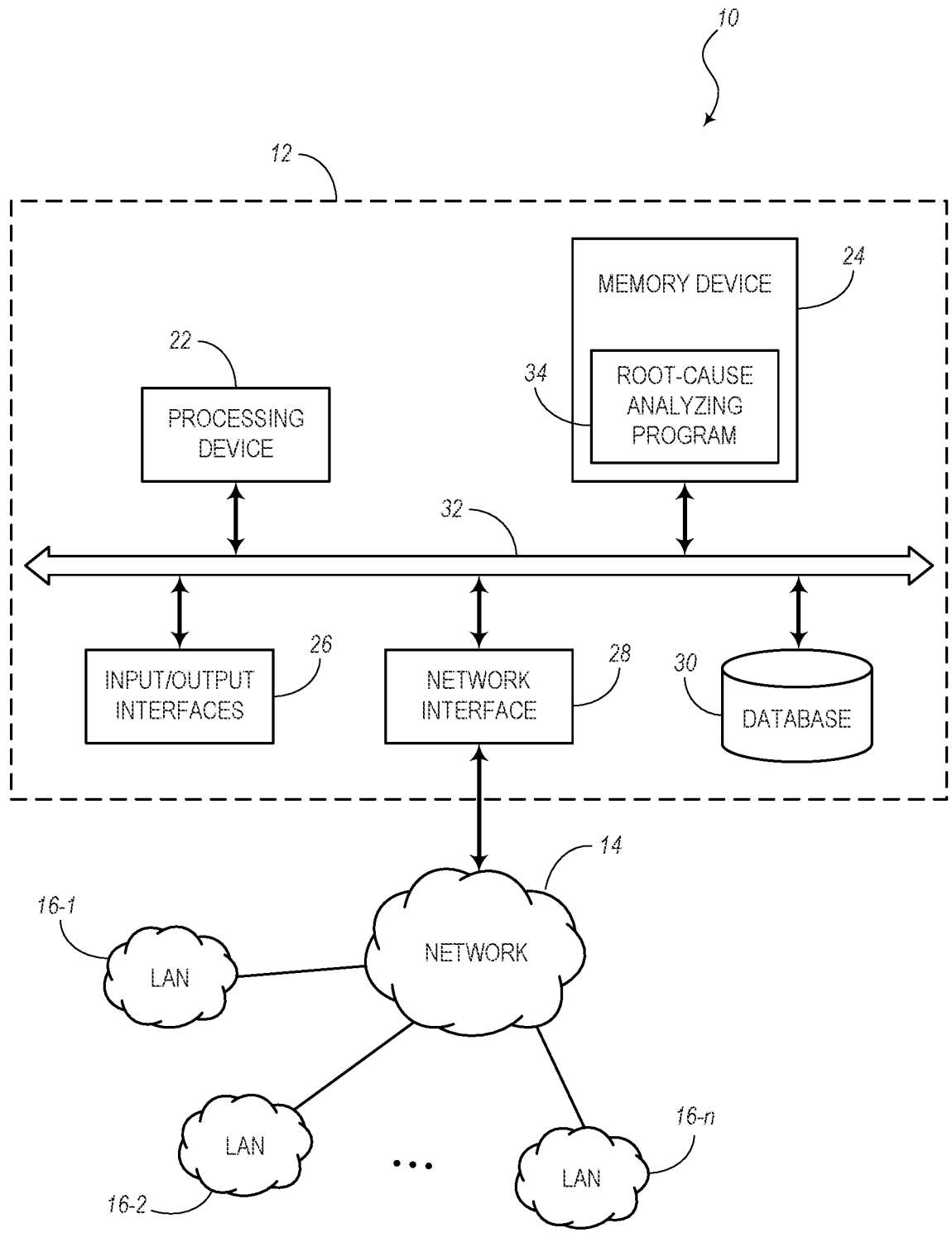
FIG. 1 is a block diagram illustrating a communication system having a computing device for automatically analyzing Wi-Fi authentication failures to determine one or more root-causes and providing automatic remediation to correct the failures, according to various embodiments of the present disclosure.

The present disclosure relates to systems and methods for root-cause analysis in a network (e.g., optical network, telecommunications network, etc.). More particularly, the present disclosure is related to embodiments configured to automatically analyze Wi-Fi authentication failures in a system to determine one or more root-causes and then provide automatic remediation to correct the failures. The present disclosure describes a use-case where Machine Learning (ML) techniques can be used in the analysis of Wi-Fi systems to detect and predict Wi-Fi issues.

In some embodiments, the embodiments may be configured to detect Wi-Fi authentication errors or other types of authentication failures, which may be implemented in a server application of a Service Provider to detect Wi-Fi issues on an enterprise network, a Local Area Network (LAN), a Wireless LAN (WLAN), etc. According to some embodiments, the present disclosure may combine Natural Language Processing (NLP) and supervised ML techniques in a new way for providing much greater accuracy than conventional systems.

The systems and methods described herein may include automating the process by applying ML techniques, ML models, analytical functions, rules-based processes, and/or user feedback. As described in the present disclosure, the systems and methods may include collecting data (e.g., Performance Monitoring (PM) data, network operational metrics, faults, errors, issues, alarms, symptoms, etc.) of components in a Wi-Fi system connected in a network. Analyzing root-causes may also rely on a knowledge base or knowledge store, such as a Knowledge error Data Base (KeDB) that correlates measurable symptoms with diagnostics of various issues.

As described in detail below, the present disclosure also includes a distance detecting process for determining a "distance" (or dissimilarity) between symptoms and diagnostics. For example, the smaller the distance (in this regard) between a symptom and a diagnostic, the more likely the diagnostic is an accurate representation of the cause of that symptom. In some embodiments, the systems and methods may provide a closed-loop procedure that includes applying remediation actions to the network to correct the issues based on the one or more detected root-causes.

The embodiments of the present disclosure are able to overcome many of the shortcomings of the conventional systems by combining the use of ML-based models for the distance computations along with a boosting technique for calibrating relative weights of distance functions for each diagnostic. The techniques described herein may employ various approaches to accomplish favorable results. The present embodiments may also apply specific rules in the system to identify a root-cause and may apply supervised ML to predict diagnostics. Furthermore, by providing a closed-loop analysis system, the embodiments herein may be configured to perform automatic remediation to correct any detected Wi-Fi failures, such as Wi-Fi authentication errors.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram illustrating an embodiment of a communication system 10. In this embodiment, the communication system 10 includes a computing device 12 connected to or in communication with a network 14. The computing device 12 may be configured for automatically analyzing Wi-Fi authentication failures to determine one or more root-causes and providing automatic remediation to correct the failures. The network 14 may be connected to or in communication with one or more Local Area Networks (LANs) 16-1, 16-2, ..., 16-n. According to some implementations, the computing device 12 may be associated with a Service Provider (SP) for providing network services to the LANs 16. Also, each LAN 16 may be configured as an enterprise network, where the enterprise network might be associated with a client of the SP.

The computing device 12 (or SP) may be configured for performing root-cause analysis within the network 14 or within one or more of the LANs 16. In the illustrated embodiment, the computing device 12 may be a digital computer that, in terms of hardware architecture, generally includes a processing device 22, a memory device 24, Input/Output (I/O) interfaces 26, a network interface 28, and a database 30. The memory device 24 may include a data store, database (e.g., database 30), or the like. It should be appreciated by those of ordinary skill in the art that FIG. 1 depicts the computing device 12 in a simplified manner, where practical embodiments may include additional components and suitably configured processing logic to support known or conventional operating features that are not described in detail herein. The components (i.e., 22, 24, 26, 28, 30) are communicatively coupled via a local interface 32. The local interface 32 may be, for example, but not limited to, one or more buses or other wired or wireless connections. The local interface 32 may have additional elements, which are omitted for simplicity, such as controllers, buffers, caches, drivers, repeaters, receivers, among other elements, to enable communications. Further, the local interface 32 may include address, control, and/or data connections to enable appropriate communications among the components 22, 24, 26, 28, 30.

The processing device 22 is a hardware device adapted for at least executing software instructions. The processing device 22 may be any custom made or commercially available processor, a Central Processing Unit (CPU), an auxiliary processor among several processors associated with the computing device 12, a semiconductor-based microprocessor (in the form of a microchip or chip set), or generally any device for executing software instructions. When the computing device 12 is in operation, the processing device 22 may be configured to execute software stored within the memory device 24, to communicate data to and from the memory device 24, and to generally control operations of the computing device 12 pursuant to the software instructions.

It will be appreciated that some embodiments of the processing device 22 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 22 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 26 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 26 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 28 may be used to enable the computing device 12 to communicate over a network, such as the network 26, the Internet, a Wide Area Network (WAN), a Local Area Network (LAN), and the like. The network interface 28 may include, for example, an Ethernet card or adapter (e.g., 10BaseT, Fast Ethernet, Gigabit Ethernet, 10GbE) or a Wireless LAN (WLAN) card or adapter (e.g., 802.11a/b/g/n/ac). The network interface 28 may include address, control, and/or data connections to enable appropriate communications on the network 26, particularly to collect data from network elements 28 (e.g., nodes, switches, routers, Optical Add/Drop Multiplexers (OADMs), etc.) of the network 26.

The memory device 24 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 24 may incorporate electronic, magnetic, optical, and/or other types of storage media. The memory device 24 may have a distributed architecture, where various components are situated remotely from one another, but can be accessed by the processing device 22. The software in memory device 24 may include one or more software programs, each of which may include an ordered listing of executable instructions for implementing logical functions. The software in the memory device 24 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 24 may include a data store used to store data. In one example, the data store may be located internal to the computing device 12 and may include, for example, an internal hard drive (e.g., database 30) connected to the local interface 32 in the computing device 12. Additionally, in another embodiment, the data store may be located external to the computing device 12 and may include, for example, an external hard drive connected to the Input/Output (I/O) interfaces 26 (e.g., SCSI or USB connection). In a further embodiment, the data store may be connected to the computing device 12 through a network and may include, for example, a network attached file server.

The database 30 may be a Knowledge error Data Base (KeDB) for storing information that correlates various types of data retrieved from the network 26 with identifiable symptoms. Also, the database 30 may further be configured to store correlations between network symptoms and known diagnostics that can be used to classify or identify root-causes. A user may enter feedback via the input/output interfaces 26 to add and/or revise data and/or relational information in the database 30.

Moreover, some embodiments may include a non-transitory computer-readable storage medium having computer readable code stored in the memory device 24 for programming the computing device 12 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 22 that, in response to such execution, cause the processing device 22 to perform a set of operations, steps, methods, processes, algorithms, functions, techniques, etc. as described herein for the various embodiments.

In particular, the memory device 24 may be configured to store a root-cause analyzing program 34, which may include Machine Learning (ML), such as supervised ML, unsupervised ML, etc. to train a ML model or other type of analytical process. In addition to ML functions, the root-cause analyzing program 34 may also use other forms of analytical functions as well as user feedback. According to various embodiments, the root-cause analyzing program 34 may be implemented in hardware, software, firmware, or any combination thereof. The root-cause analyzing program 34 may enable the processing device 22 to perform certain functions to analyze one or more root-causes or issues in the network elements 28 operating on the network 26. The functions of the root-cause analyzing program 34 are described throughout the present disclosure.

For example, the root-cause analyzing program 34 may enable the processing device 22 to collect relevant data (e.g., PM data, alarms, etc.) from the network 26 via the network interface 28 and utilize the relational information of the database 30 to determine whether or not the relevant data points to any issues, errors, symptoms, etc. If so, the root-cause analyzing program 34 may be configured to compute distances between the detected symptoms in the network and known diagnostics. The distances may be used to classify (or rank) the diagnostics for sets of symptoms. Different types of distance functions may be used for different diagnostics. This process may involve ML boosting to calibrate the weights of the distances. The root-cause analyzing program 34 may use classifiers and/or diagnostics to analyze the root-causes, such as by using filtering and ranking procedures. In some case, the root-cause analyzing program 34 may further provide automatic remediation processes for correcting or remediating the root-causes in the network elements 28 of the network 26.

Furthermore, the root-cause analyzing program 34 may be configured to enable the processing device 22 to monitor a Wi-Fi system associated with one of the LANs 16 to detect and identify authentication issues (e.g., failures, faults, errors, etc.) in the Wi-Fi system. When the root-cause analyzing program 34 identifies one or more authentication issues, the processing device 22 may be configured to analyze the one or more authentication issues to determine one or more root-causes of the issues. Upon determining the root-causes, the root-cause analyzing program 34 may further enable the processing device 22 to push changes to the Wi-Fi system (via the network interface 28, network 14, and respective LAN 16) to automatically remediate the one or more root-causes in the Wi-Fi system. According to embodiments in which the computing device 12 is local to the Wi-Fi system, the pushing of the changes to remediate the root-causes may be performed directly without involvement of the network 14 (e.g., Wide Area Network (WAN)).

Therefore, according to some embodiments, the present disclosure describes systems and methods for a) identifying root-causes for Wi-Fi authentication failure scenarios and b) remediating these root-causes in a fully automated closed-loop manner. As described in more detail below, the process of identifying root-causes for Wi-Fi authentication failures according to the present implementations can provide very high accuracy.

Enabling closed-loop automation in networks can result in huge benefits (e.g., Operating Expenditure (OPEX) savings, better Service Level Agreement (SLA) compliance, fewer service interruptions, more optimized network performance, etc.). Although closed-loop automation in conventional systems includes complex tasks and requires the crafting of detailed rules to identify and remediate issues in a network, the present disclosure is configured to overcome these complexities of the conventional systems. Moreover, these rules in the conventional systems need to be kept up-to-date as a network evolves, especially since closed-loop automation in Wi-Fi systems often involves many heterogenous devices (e.g., Access Points (APs), Wireless LAN Controllers (WLCs), Network Access Controller (NAC) devices, policy managers, directory service devices, etc.) to be monitored for analyzing problems. However, the embodiments of the present disclosure are able to handle these challenges by providing supervised and unsupervised ML processes, accurate detection of root-causes, user feedback, and recordation of known solutions stored in a database (e.g., database 30).

Wi-Fi System

Figure 2:
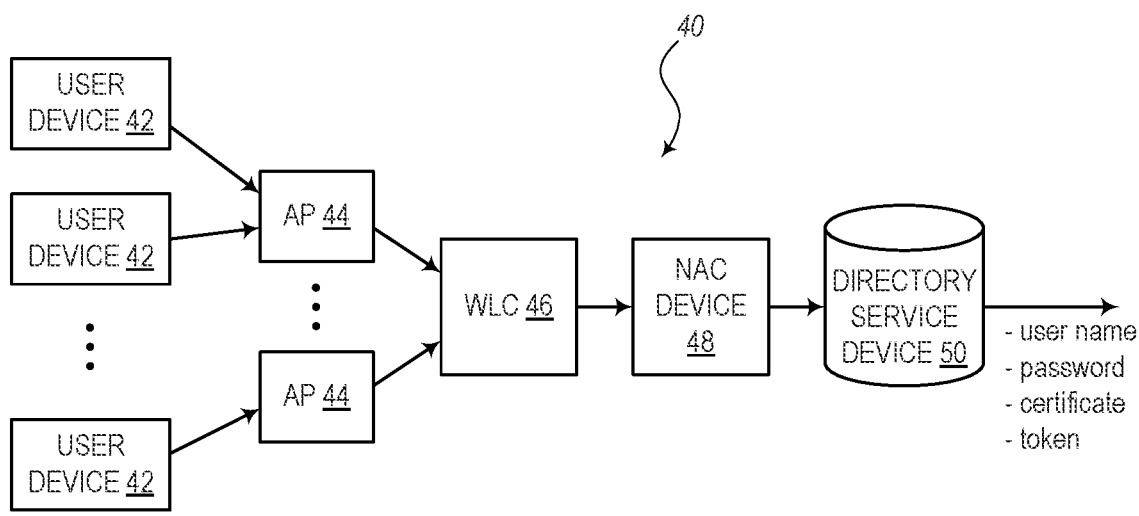
FIG. 2 is a diagram illustrating a Wi-Fi system, which may be part of or associated with one of the Local Area Network (LANs) shown in FIG. 1, according to various embodiments of the present disclosure.

FIG. 2 is a diagram illustrating an embodiment of a Wi-Fi system 40, which may be part of or associated with one of the LANs 16 shown in FIG. 1. In this embodiment, the Wi-Fi system 40 may include at least one or more user devices 42, one or more Access Points (APs) 44, a Wireless LAN Controller (WLC) 46, a Network Access Control (NAC) device 48, and a directory service device 50. In addition, the Wi-Fi system 40 may further include firewall devices, switches, routers, and other network elements associated with a LAN, network node, etc. The components 42, 44, 46, 48, 50, etc. of the Wi-Fi system 40 may be provided by different vendors and operate together using common standards and protocols.

The root-cause analyzing program 34 may reside in a remote system (as shown in FIG. 1) and communicate with the Wi-Fi system 40 via the network 14 and respective LAN 16. In other embodiments, the root-cause analyzing program 34 may reside in the Wi-Fi system 40 itself and provide local analysis of root-causes. In still other embodiments, the root-cause analyzing program 34 (along with other suitable hardware, software, and/or firmware) may reside in a plurality of local and remote locations to analyze root-cause of Wi-Fi issues (e.g., Wi-Fi authentication failures) in the Wi-Fi system 40.

The root-cause analyzing program 34 may be configured to perform root-cause analysis with several advantages over conventional systems. For example, the root-cause analyzing program 34 may include:

1. Data collection from disparate sources;
2. Learning correlations in the data;

3. Pre-populating modes in a Known error Data-Base (KeDB);
4. Performing root-cause analysis (e.g., using inference); and
5. Remediation of the root-cause.

For example, data collection may include collecting data from a number of disparate sources (e.g., any or all of components 42, 44, 46, 48, 50). The collected data may include information regarding events in the Wi-Fi system 40, alarms, syslog data, performance metrics, and/or other suitable types of data. It may be noted that the present disclosure is configured to obtain more information than is usually collected in conventional systems. Therefore, once this data is collected, the root-cause program 34 may be configured to correlate the data according to certain procedures as described herein, which can result in predictions with high accuracy.

In some embodiments, the root-cause analyzing program 34 may be configured to utilize ML techniques for training a ML model. In this sense, the ML techniques can be used to analyze the collected data to learn correlations within data. For example, the data may include performance metrics, Performance Monitoring (PM) data, alarms, syslog messages, alerts, etc. related to one or more devices (e.g., components 42, 44, 46, 48, and/or 50). The correlation of data points may result in a complex format with mixed datatypes. In order to get the full value out of this data, the ML techniques of the present disclosure may include making textual data more insightful and fusing it with numeric data. For model-training purposes, a unique ML pipeline (as described below with respect to FIG. 5) may be used, which works with both the complex textual data and other categorical/numeric data.

In order to readily identify root-causes, the computing device 12 may be configured to pre-populate the database 30 (or other data storage device) with known issues as well as models that have previously trained for the different issues. These models may be known to give high accuracy with respect to identifying Wi-Fi issues. In addition, the ML models can be trained to handle newly discovered issues in order to extend beyond just the known errors to include other types of issues.

Root-cause analysis may then be performed (e.g., using the root-cause analyzing program 34) using any suitable pre-trained ML models or inference engines against live data. The root-cause analyzing program 34 may use similar data transformation to the ones that were used for originally training data on the new incoming data. The data transformations may be fed to the pre-trained models to perform root-cause analysis in near real time. In this manner, it is possible to achieve results that have high accuracy for predicting Wi-Fi issues with little latency.

Regarding closed-loop systems, the root-cause analyzing program 34 may further be configured to automatically perform remediation of the one or more root-causes. Instead of requiring a human (e.g., user, network operator, NOC employee, etc.) to manually remediate the root-causes, the root-cause analyzing program 34 allows for an automated way to push configuration changes to the devices 42, 44, 46, 48, 50. The remediation process steps may be pre-configured in the database 30 to accomplish this automated correction procedure.

The root-cause analyzing program 34 of the present disclosure may be configured to leverage Machine Learning (ML) to identity root-causes for user authentication issues in any Wi-Fi system (e.g., a multi-layer Wi-Fi-enabled network), which may typically be found in an enterprise network. Although the present disclosure focuses on authentication issues, the root-cause analyzing program 34 may also be applied to any type of issues in the Wi-Fi domain. Thus, the process can be completely automated for Root-cause Analysis (RCA) and may remove any user tasks that are normally time-consuming and error-prone. Moreover, RCA may be integrated with a decision-driven workflow-based framework to automate pushing changes to the devices in order to remediate. Pre-configured workflows of the root-cause analyzing program 34 may be configured to remediate various Wi-Fi authentication issues, which may be identified by ML models.

According to some embodiments, if there is a Wi-Fi domain and a LAN domain, the types of issues happening in the network can affect one or more users. Using a comparison against intermediate nodes, the systems and methods of the present disclosure can give valuable information about the types of issues that are detected. The systems can determine whether the issues belong on the Wi-Fi domain or the LAN domain. Also, the systems may be configured to determine if the issues affect a single user or multiple users. This may be helpful information for a user (e.g., network operator), who may view the issues in a network on a User Interface (UI) and get a sense of the priority for correction of the issues.

Generalized Four-Step Root-Cause Analysis Methodology

In the present disclosure, a data collection system (not shown) may be utilized for collecting relevant data from the network elements. For example, this data may include performance metrics, alarms, syslog messages, etc., which can be streamed to a message bus. According to some embodiments, the systems and methods of the present disclosure may be configured to provide a four-step mechanism to determine the relevant diagnostics given a set of symptoms. From the diagnostics and symptoms, the present systems may be configured for automating the process of RCA in a way that can generalize well to accommodate new types of problems. In this example, the four steps may include:

1. Collect relevant data from the network and stream the data to a message bus.
2. Compute a "distance" of new data (symptoms) to known diagnostics and diagnostic families from the Known error Data Base (KeDB) or other knowledge base using both analytical and ML-based models.
3. Filter and Rank the diagnostics and diagnostic families to present only relevant diagnostics to the end user.
4. In order to perform CLA, the network automation workflow can be triggered if the distance offered by the inference engine is well within a trigger threshold.

These four steps are described in more detail below.

I. Step One: Data Collection

Relevant data collected from the network devices is pre-processed into an interpretable format so that exploratory data analysis can be performed, and the same pre-processed data can be fed to ML algorithms for training purposes. In the present disclosure, data may be obtained from the WLC 46 and/or the NAC device 48 and provided to a suitable data collection module (e.g., database 30). Later data collected from the Wi-Fi system 40 may be parsed, pre-processed, and used for model training and inference.

II. Step Two: Distance Computation

Instead of using the output of a supervised model to predict a root-cause given a set of symptoms, the root-cause analyzing program 34 may be configured to use machine learning and analytical formulas to compute "distance" between a set of symptoms (e.g., observed network problems) and known diagnostics. In this case, the variable "distance" is a measure of dissimilarity of the observed network problems from known diagnostics. Thus, the smaller the distance, the greater the likelihood that a diagnostic is an actual root-cause.

The choice of an algorithm vs another may generally depend on the actual data. It may be noted that the approaches of the present disclosure may allow the systems and methods to explicitly leverage feedback from users to compute the distance. This may be unlike a typical ML system where user feedback is used to enrich the input dataset and implicitly improves the ML model when it is retrained.

Hierarchical Root-Cause Analysis

Root-causes may normally be categorized using a natural hierarchical structure. This structure may be dictated by a resolution process followed by network operators. For example, a network operator may start with the most likely and general root-cause, then proceed to eliminate potential issues, and then further refine the diagnostic to pin-point the exact issue.

Figure 3:
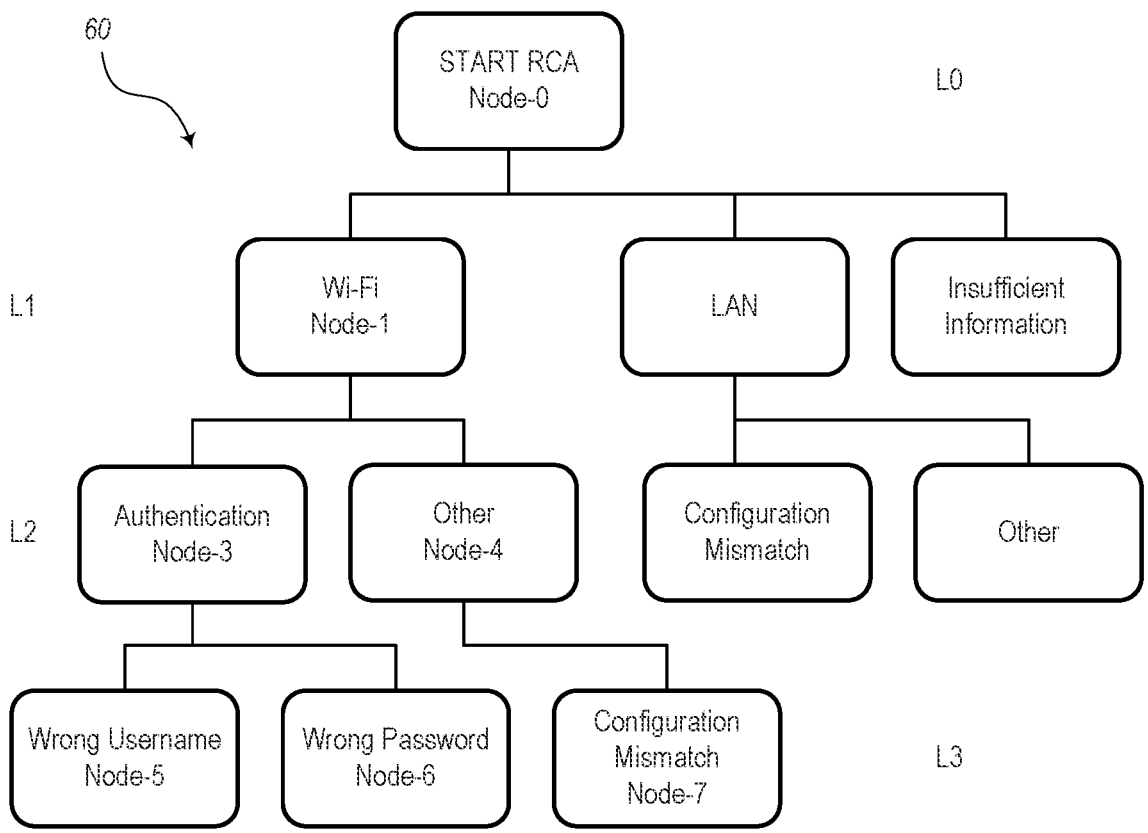
FIG. 3 is a diagram illustrating a hierarchical Wi-Fi failure diagnostic tree, according to various embodiments of the present disclosure.

FIG. 3 is a diagram illustrating an embodiment of a hierarchical Wi-Fi failure diagnostic tree 60. In this embodiment, the hierarchical Wi-Fi failure diagnostic tree 60 includes four levels (i.e., Level 0, Level 1, Level 2, and Level 3). Level 0 corresponds to a Root-cause Analysis (RCA) for an entire system (or network) and includes a single node that may be referred to as a "root" of the tree 60. Level 1 corresponds to root-cause families and includes nodes that may be referred to as branches of the tree 60. Level 2 corresponds to root-cause classes and includes nodes that may be referred to as sub-branches of the tree 60. Also, Level 3 corresponds to the specific root-causes and includes nodes that may be referred to as leaves of the tree 60.

One of the benefits of using the approach as defined by the hierarchical Wi-Fi failure diagnostic tree 60 is that it can handle the natural hierarchical nature of root-causes. Specifically, the distance function (corresponding to a measure of dissimilarity between symptoms and diagnostics) may be generalized to the internal nodes in the tree 60. For instance, the families (or types of root-causes defined in Levels 1 and 2) in addition to the leaves (i.e., the specific root-causes defined in Level 3) are generalized. This is particularly useful when the distance between unknown symptoms and the root-causes is too high (e.g., greater than a certain threshold), meaning that an actual root-cause cannot be predicted with high confidence. However, it may still be possible to predict the class of RC.

In the present disclosure, the tree 60 can be applied to real-world Wi-Fi problem scenarios to enable specific use-cases. A few of the most prominently occurring Wi-Fi authentication failure issues are listed below. With closed-loop automation systems, the root-cause analyzing program 34 may deliver differentiation from conventional systems. Some Wi-Fi authentication failure scenarios may include:
  Wrong username
  Wrong password
  Configuration mismatch
  Service categorization failure In addition to these scenarios, the hierarchical Wi-Fi failure diagnostic tree 60 may be configured to identify a number of other types of issues. Any observed issues apart from the above-listed scenarios may be identified as "Insufficient Information," rather than showing a situation where there is low confidence in the identity of predicted root-causes to the network operators. In this respect, it is possible to further analyze these originally unidentified issues with additional ML processes to expand the categorization of new (or previously unidentified) Wi-Fi issues. As the scope of knowledge is expanded, the new identification processes may include the addition of new nodes in the tree 60. As such, the number of symptoms falling into the category of "Insufficient Information" may eventually diminish over time.

Using the hierarchical Wi-Fi failure diagnostic tree 60 and a known error database for root-cause analysis, the embodiments of the present disclosure may be configured to map each root-cause with its parent class node. Using this mapping, along with an outcome of a machine learning pipeline (e.g., as described below with respect to FIG. 5) and leveraging analytical formulations, the root-cause analyzing program 34 may be configured to calculate the distance for each path in the tree/hierarchy using the following distance equation:

$$\delta = \Sigma_{k=1}^{n} -\log_{10}(P(\mathcal{C}))$$

where $\delta$ is the distance, k is a node sequence in the hierarchical tree path, n is the length of the tree path, $\mathcal{C}$ is a ML model outcome in terms of probability (P) for a kth root-cause (node) in the tree provided symptoms (e.g., syslog data), and $\log_{10}$ is the common logarithm with base 10, which can be relied on for more precision while comparing two closer paths to limit the vanishing gradient effects. The distance parameter $\delta$ is calculated for each tree path in the hierarchy. Whichever path yields the lowest distance is ranked the highest, whichever path yields the second lowest distance is ranked the second highest, and so on.

In the example of FIG. 3, the distance can be calculated to identify the existence of several nodes within the hierarchy at different levels. The levels and classes of nodes include Level 0, which is the top of the hierarchy and start of the RCA. This level includes Node-0. Level 1 is a root-cause family level and includes Node-1, a node related to the LAN realm, other type of networks, and other unidentified nodes representing situations where there is insufficient information to make an immediate analysis. Level 2 is a root-cause class level and includes Node-3, Node-4, and other nodes (e.g., configuration mismatch) related to the LAN realm and/or other type of networks in addition to other unidentified situations. Level 3 represents the actual root-causes themselves and includes, in this example, Nodes 5-7 plus other nodes related to LAN or other type of networks.

According to this example, there may be three identified paths in total which may be traversed in the hierarchical Wi-Fi failure diagnostic tree 60. For instance, Path-1 may include (from top to bottom) Node-1, Node-3, and Node-5. Path-2 includes Node-1, Node-3, and Node-6. Path-3 includes Node-1, Node-4, and Node-7.

The distance calculations may be computed for each node in the paths and then accumulated together to arrive at a distance parameter for each path (i.e., from the root or Level 0 to the leaf or Level 3). The traversal process goes from the top to the bottom of the tree. Hence, traversal to Level-1 is calculated first for the root-cause family (i.e., Node 1 or other) to check for input pre-processed device symptoms. Then traversal to Level-2 is calculated for root-cause class of that root-cause family. Finally, traversal to Level-3 is calculated for the actual root-cause within that class.

III. Step Three: Filtering and Ranking

The ranking of diagnostics can then be determined by computing distance between known diagnostics and then sorting them in increasing order. Distance with the lowest value (and higher than a pre-defined confidence threshold) is considered as a root-cause.

A. Filtering

In some embodiments, there may be predetermined thresholds for traversing these paths per level. For example, some predetermined thresholds may include:

Level-1: Confidence Threshold>90%
Level-2: Confidence Threshold>75%
Level-3: Confidence Threshold>60%

If none of the nodes passes the above threshold criteria, then the present embodiments are configured to mark the input symptoms into the "Insufficient Information" category or other similar category, rather than showing a low-confidence root-cause to the network operators. This can then be added to a research journal for future readiness when similar symptoms are obtained.

According to an example, suppose that the following probability/confidence percentages per node are calculated for a particular symptom related to a "Wrong Username" Wi-Fi failure scenario:

Node-1: 98%
Node-3: 95%
Node-4: 81%
Node-5: 90%
Node-6: 10%
Node-7: 72%

Considering the above ML model confidences, the root-cause analyzing program 34 may be configured to identify that Path-1 and Path-3 satisfy the example threshold criteria. Hence, considering the distance δ of Path-1 and Path-3 for distance calculations:

$$Distance_{PATH-1}=[-\log(0.98)]+[-\log(0.95)]+[-\log(0.90)]=0.07680781$$

$$Distance_{PATH-3}=[-\log(0.98)]+[-\log(0.81)]+[-\log(0.72)]=0.242956409$$

B. Ranking

From the above calculations, the root-cause analyzing program 34 may be configured to determined that the distance value for $Distance_{PATH-1}$ is much closer to zero compared to $Distance_{PATH-3}$. Hence, $Distance_{PATH-1}$ may be selected as a final root-cause after going through an optimized tree-traversal. For the given symptoms, the root-cause analyzing program 34 may be configured to confidently determine that the issue is related to the "Wrong Username" scenario. Once the issue is identified, the Closed Loop Automation (CLA) workflow can be triggered to remediate issues in the Wi-Fi system 40.

The ranking of diagnostics can then be determined by computing normalized distances and then sorting them in decreasing order. It is important to note that even when a ranking is available, the computing device 12 might not be able to deduce a root-cause with high confidence if all the distance values are relatively equal and small in magnitude. This can happen if the computing device 12 encounters a new type of problem that it does not know about or if the symptom data does not have enough information to pinpoint the issues. In order for the computing device 12 to be confident about a diagnostic, the normalized distance should be sufficiently close to zero. As part of the weight calibration process, the computing device 12 may also learn a threshold λ such that $d(\sigma, A_X)*w_A<\lambda$ results in making $A_X$ a valid diagnostic for symptoms observed.

Figure 4:
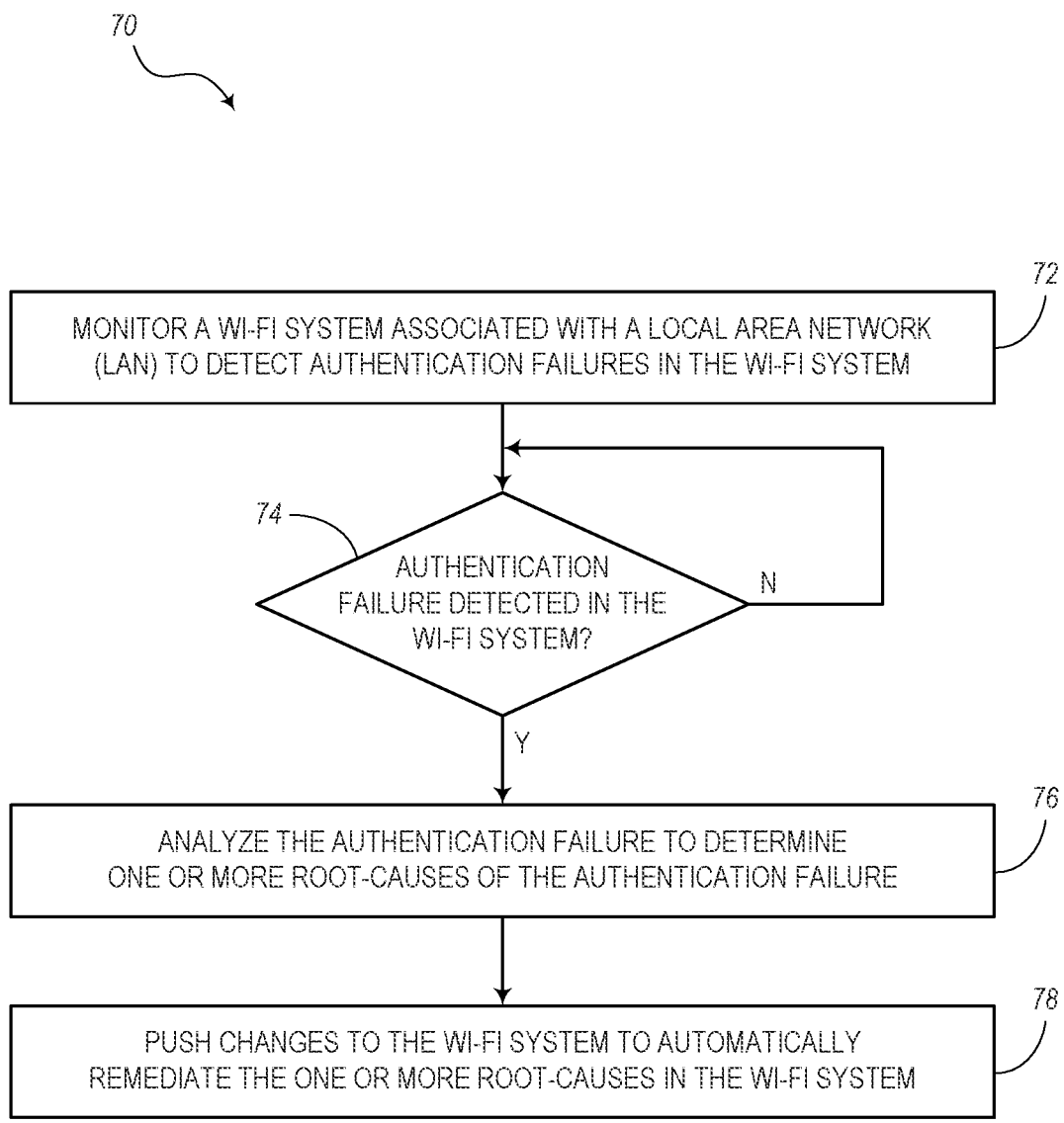
FIG. 4 is a flow diagram illustrating a process for automatically detecting and remediating root-causes in a Wi-Fi system associated with a LAN, according to various embodiments of the present disclosure.

FIG. 4 is a flow diagram illustrating an embodiment of a process 70 for automatically detecting and remediating root-causes in a Wi-Fi system (e.g., Wi-Fi system 40) associated with a LAN (e.g., LAN 16). In this embodiment, the process 70 includes monitoring the Wi-Fi system associated with the LAN to detect authentication failures in the Wi-Fi system, as indicated in block 72 The process 70 further includes determining whether there is an authentication failure in the Wi-Fi system, as determined in decision diamond 74. In response to detecting an authentication failure in the Wi-Fi system in decision diamond 74, the process 70 includes analyzing the authentication failure to determine one or more root-causes of the authentication failure, as indicated in block 76. Then, the process 70 includes pushing changes to the Wi-Fi system to automatically remediate the one or more root-causes in the Wi-Fi system, as indicated in block 78.

Furthermore, according to additional embodiments, block 78 of process 70 may include automatically remediating the one or more root-causes using a closed-loop automation process. Also, monitoring the Wi-Fi system (block 72) may further include collecting data in the Wi-Fi system and streaming the data to a message bus. The collected data may be related to symptoms indicative of issues in the Wi-Fi system, and wherein monitoring the Wi-Fi system (block 72) may also include computing distances between the symptoms and a set of diagnostics, whereby the computed distances may correspond to dissimilarities between the symptoms and each of the diagnostics. The step of analyzing the authentication failure to determine the one or more root-causes (block 76) may further include filtering the symptoms based on confidence thresholds to obtain one or more paths and ranking the one or more paths based on the computed distances of the one or more paths. The step of pushing the changes to the Wi-Fi system to automatically remediate the one or more root-causes (block 78) may include remediating a root-cause for a highest-ranked path having the lowest computed distance before remediating one or more other root-causes.

Analyzing the authentication failure in the Wi-Fi system may also include utilizing a hierarchical root-cause analysis tree having multiple levels to determine the one or more root-causes. Automatically remediating the one or more root-causes may further include creating an incident request in an Information Technology Service Management (ITSM) system and creating a change implementation request. Upon approval of the change implementation request by a change management system, the process 70 may further include the step of applying the implementation request to the Wi-Fi system.

Additionally, the Wi-Fi system may include, for example, one or more user devices, one or more Access Points (APs), a Wireless LAN Controller (WLC), a Network Access Control (NAC) device, a policy manager, a directory service device, etc. Monitoring the Wi-Fi system (block 72) may include obtaining syslog data from the WLC and NAC device, pre-processing the syslog data, and applying the pre-processed syslog data to a Machine Learning (ML) training system. For example, the step of pre-processing the syslog data may include utilizing one or more text searching techniques. The syslog data may be related to Performance Monitoring (PM) data, alarms, syslog messages, etc.

The process 70 may be further defined whereby the authentication failure in the Wi-Fi system may include one or more of a wrong username error, a wrong password error, and a configuration mismatch. The LAN, according to some embodiments, may be part of an enterprise system.

Machine Learning Pipeline

The syslog messages/datasets from the data collection module are typically in a complex unstructured and noisy text format, which typically is not suitable for most ML algorithms. In order to get high accuracy and precision, tailored pre-processing may be utilized to make the textual data more insightful and suitable for ML model training. In order to handle a mixture of raw text and quantitative features from the WLC 46 and the NAC device 48, the root-cause analyzing program 34 may utilize a ML pipeline which combines Natural Language Processing (NLP) techniques and supervised ML models to extract relevant information as described below.

Figures 5, 6:
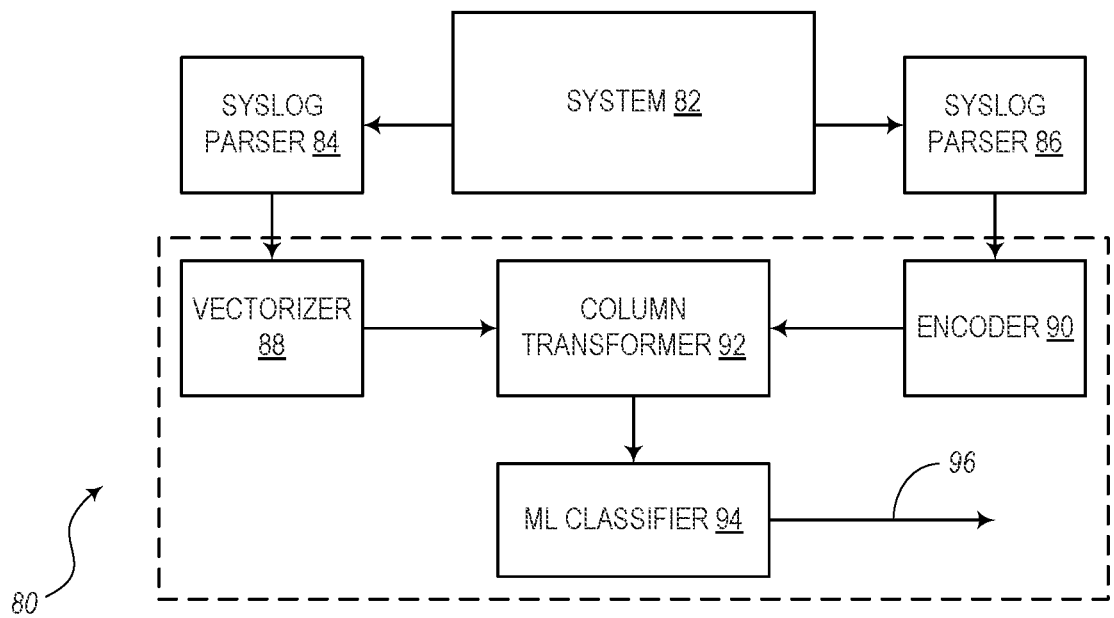
FIG. 5 is a schematic diagram illustrating a Machine Learning (ML) training pipeline, according to various embodiments of the present disclosure.
FIG. 6 is a table illustrating the total data set for various root-causes, according to various embodiments of the present disclosure.

FIG. 5 is a schematic diagram illustrating an embodiment of a ML training pipeline 80. A system 82 (e.g., a Wi-Fi system operating in a network) can be monitored by a first syslog parser 84 and a second syslog parser 86. An authentication server may request a timeout and the syslog parsers 84, 86 can obtain various information from the system 82. The syslog parsers 84, 86 may receive, for example:

username=wronguser
userip=0.0.0.0
usermac=88:a4:79:31:fd:63
servername=clearpass
server-group=bpe_lab_test_dot1_svg
serverip=10.182.162.167
bssid=f4:2e:7f:35:27:a2
error-msg=User Authentication failed.
username=wronguser
userip=0.0.0.0
usermac=88:a4:79:31:fd:63
servername=clearpass
server-group=bpe_lab_test_dot1_svg
serverip=10.182.162.167
auth-method=EAP-MSCHAPv2
error-code=201
bssid=f4:2e:7f:35:27:a2

The ML training pipeline 80 may further include a text vectorizer 88 for receiving data from the first syslog parser 84. The text vectorizer 88 may be configured to derive information using an algorithm related to a Term Frequency-Inverse Document Frequency (TF-IDF) technique to create features from the text data. The algorithm of the text vectorizer 88 may also be configured to apply stemming and lemmatization processes to the syslog messages before Term Frequency metrics are computed. Furthermore, the ML training pipeline 80 may also include an encoder 90 that may be configured to convert key-value pair data into ML features. For example, the encoder 90 may utilize a One-Hot Encoder. The aggregate results from the text vectorizer 88 and the encoder 90 are combined using a column transformer 92. Lastly, the vector transformed data is fed to an ML classifier 94 for model training and probabilistic analysis. The ML classifier 94 may be configured to output a ML model 96 for use by the root-cause analyzing program 34. The flow of the ML training pipeline 80 forms a unique pipeline to train for various types of Wi-Fi authentication issues.

Accuracy Evaluation

In order to gauge the accuracy of the root-cause analyzing program 34 and ML training pipeline 80 for identifying different type of Wi-Fi issues, performance tests were conducted. The results of the tests were collected over a few months. In this example, data was obtained from a lab network representing a typical enterprise network having: a) several Wireless LAN (WLAN) Controllers (WLCs) from different vendors, b) numerous Access Points (APs) from different vendors, c) Network Access Controllers (NACs) from different vendors, and d) 33 device families (e.g., multi-layer, multi-domain) from different vendors.

To get an accurate picture of how the root-cause analyzing program 34 and ML training pipeline 80 performs on new data in the field, the obtained data was divided into training data sets and testing data sets. The training data sets were used for learning and the testing data sets were used to test the system with new data. Also, the high-imbalanced class problems were addressed using advanced ML algorithms. FIG. 6 is a table illustrating an example of a distribution of data points of the test results for various root-causes.

Performance of Machine Learning Pipeline

A. Dataset

In the creation of a ML model, a healthy train test split is used in order to consider all the root-cause scenarios for evaluating a model. In this example, a data split of 80% to 20% was used for the training dataset and the testing dataset, respectively, with a number of data points totaling 1474. For a final model, 100% of the data was consumed for training the models.

B. Model Evaluation (Consolidated Metrics)

The nature of the ML problem includes: Multi-class classification. The algorithms tried out included: Random-Forest/XGBoost classifier's blend with mathematics to reach until the final root-cause. The model deployment process included: Converted models to an Open Neural Network Exchange (ONNX) format. The ONNX is an open standard format for representing ML models and is supported by a community of partners who have implemented it in many frameworks and tools. Also, the metrics considered include: Classification Report, Confusion Matrix, ROC-AUC curve, and Precision-Recall curve.

A summary of the evaluation may be defined, whereby:

1. Even though the example deals with a complex data format and is a heavily imbalanced dataset, the F1 scores for each class tells how well each of the present models was trained.
2. A 100% F1 score simply means that the model is not going to miss any root-causes when any of the Wi-Fi authentication problems happen. This means that none of these issues will go unnoticed and hence network operators can be certain that the issues will always be remediated in real time.
3. The 100% accuracy means that the model will not only catch all the issues when they do happen, but also, it will never misclassify something as a problem when it is not. It can be particularly important for this approach to be of practical importance as this will make sure no human efforts and precious inspection time is spend investigating things that are not real issues.

Confusion Matrix

Perhaps a better way to evaluate the performance of a classifier is to look at a confusion matrix. The general idea is to count the number of times instances of class A are classified as class B. FIG. 7A is an example of a confusion matrix illustrating an evaluation of the performance of the present classifier. The confusion matrix shows that the ML training pipeline 80 is able to classify every root-cause/class perfectly with zero false positive (100% accuracy).

Area Under the Receiver Operating Characteristic (ROC) Curve (ROC-AUC)

FIG. 7B is a graph showing an example of a Receiver Operating Characteristic-Area Under the Curve (ROC-AUC) plot illustrating the performance of a ML model obtained using the ML training pipeline 80. The plot shows how well the model performs regardless of the heavily imbalanced and varied training dataset. In the test, 10× cross-validation folds were applied just to check the model performance and the True Positive Rate (TPR)—False Positive Rate (FPR) plot shows a perfect Area Under the Curve (AUC) of 1.0 for fully shuffled cross-validated dataset.

IV. Step Four: Closed-Loop Automation

Figure 8:
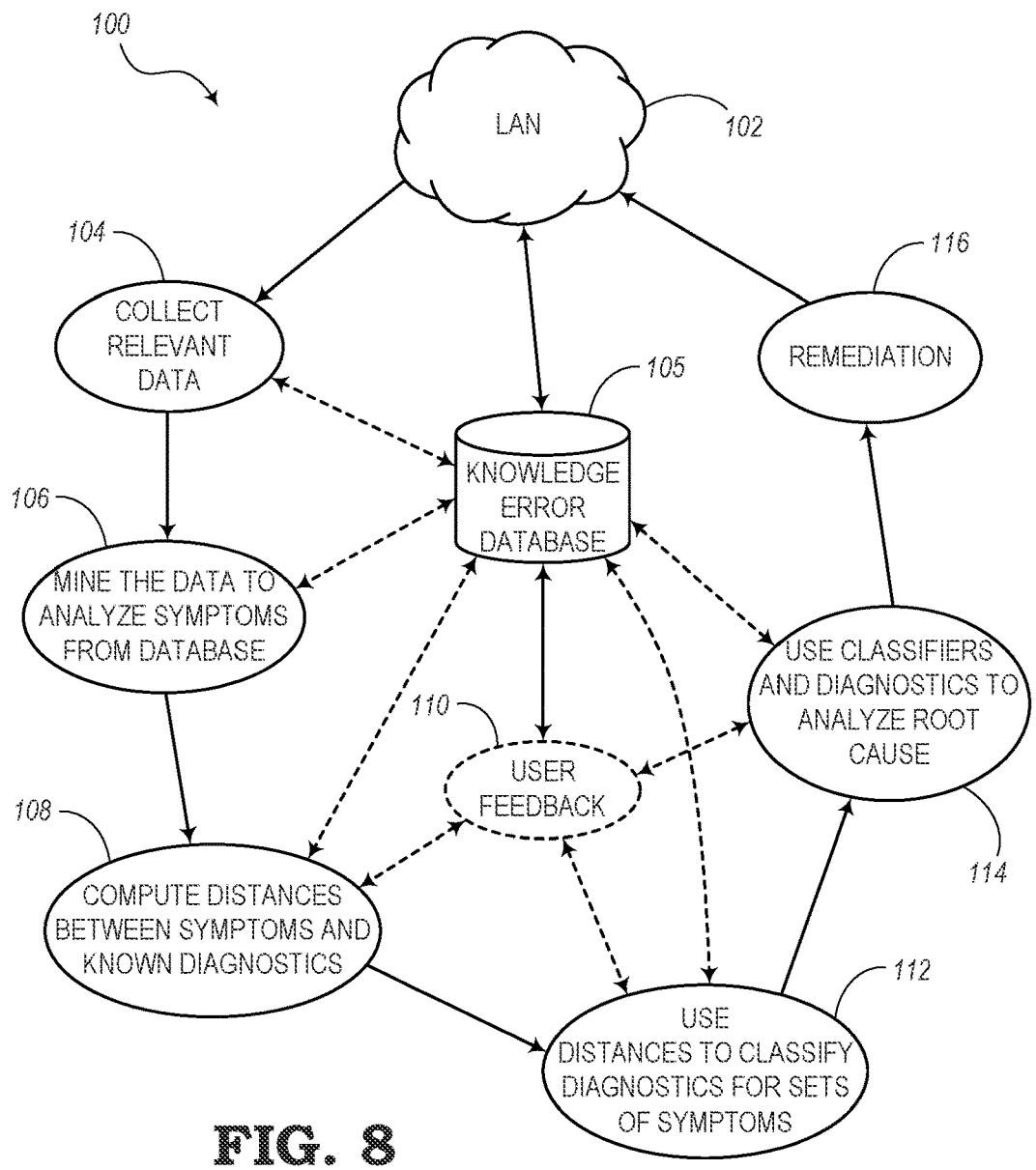
FIG. 8 is a diagram illustrating a closed-loop system for analyzing root-causes and performing remediation, according to various embodiments of the present disclosure.

FIG. 8 is a diagram illustrating an embodiment of a closed-loop system 100 for analyzing root-causes of a Wi-Fi system and performing remediation. The closed-loop system 100 includes physical and functional features. A LAN 102 (e.g., network 14, LAN 16, or other networks) may include or may be connected to Wi-Fi systems or network elements that are analyzed to determine any root-causes that create issues in the LAN 102. The closed-loop system 100 is configured to perform multiple actions for determining root-causes and alternatively for performing remediation actions if possible. A first action 104 includes collecting relevant data from the LAN 102. This data may be stored in a Knowledge error Data Base (KeDB) 105 (e.g., the database 30 shown in FIG. 1 or similar data storage device). The closed-loop system 100 further includes another action 106 of mining the data to analyze symptoms from the database 105.

The closed-loop system 100 also includes the action 108 of computing distances between the analyzed symptoms and known diagnostics, the relationships of which may be stored in the KeDB 105. Also, the action 108 may include prompting a user (e.g., network operator, personnel at a Network Management System (NMS), etc.) to provide user feedback 110 for altering the relational data in the KeDB 105 as needed. For example, the data may be changed based on factors or knowledge that may not necessarily be gleaned from the LAN 102.

Also, the closed-loop system 100 includes the action 112 of using the distances (computed in action 108) to classify diagnostics for sets of symptoms, which may be used to update the KeDB 105. Again, the user may provide user feedback 110 to further update the KeDB 105. The closed-loop system 100 also includes the action 114 of using classifiers and diagnostic information to analyze one or more root-causes in the LAN 102 and again the KeDB 105 may be updated as a result of this action 114 or via user feedback 110. Knowing the root-cause may end the process at this point. However, in some embodiments, the closed-loop system 100 may further include an action 116 of performing remediation to correct or remediate the LAN 102 or Wi-Fi system based on the detection of the one or more root-causes. If remediation is not possible, the root-causes can be communicated to the user to allow the user to initiate maintenance procedures, deployment new or replacement equipment, instruct experts to perform upkeep or modification processes on the nodes or networks elements of the network 26, and/or other suitable processes to reduce the issues, root-causes, etc. on the network 26.

Therefore, the present disclosure describes embodiments of Machine Learning (ML) processes and ML-based systems for effective root-cause analysis. A common approach for root-cause analysis is to leverage supervised ML, and train an algorithm (e.g., ML model) to recognize a particular diagnostic, given some input data from the network 26 (e.g., performance metrics, alarms, topology, etc.). In this common scenario, a binary classifier can be trained to determine if a diagnostic (D) is the root-cause of the issue or not. Multi-class classifiers (e.g., Random Forests, Deep Neural Networks (DNN), etc.) may be used as well to identify a particular root-cause. For example, each ML class may correspond to a root-cause. This approach works well to identify a particular class of problems, wherein the root-causes are reasonably similar, such as when the input data from the network elements 28 are similar and may be used to feed a classifier.

Conventional approaches fall short for multi-domain networks, such as those found in most medium/large enterprises. Those enterprise networks typically comprise elements such as Layer 2 (L2) switches, Layer 3 (L3) routers, firewalls, Wi-Fi controllers and access points, Software-Defined Wide Area Network (SD-WAN) controllers and edge devices, Virtual Network Functions (VNFs), and applications in the cloud. Consider an example of a typical scenario in an Information Technology (IT) system where an employee is unable to access a document on a cloud or server in a lab from the employee's laptop. Some of the possible root-causes may include issues with Wi-Fi connectivity, security of a Virtual Private Network (VPN), hardware failure of a switch/router in the lab, incorrectly configured firewall, etc.

Unlike other conventional disclosures on root-cause analysis which focus on model training and accuracy, the present disclosure may include knowledge representation to build an ML-based known-error database (e.g., database 30, KeDB 105, or other suitable data storage devices). The present disclosure may also include data mining aspects (e.g., action 106) to enable the systems to effectively identify a root-cause (e.g., action 114) amongst many in a Wi-Fi system or heterogeneous multi-domain network when new unknown symptoms are fed to the closed-loop system 100. Furthermore, the present disclosure provides additional embodiments of frameworks for data driven root-cause analysis by enabling the following procedures, which may be conducted by the processing device 22 using the root-cause analyzing program 34 shown in FIG. 1.

In the present disclosure, it may be assumed that a data collection system is available to collect relevant data from the Wi-Fi systems, including performance metrics, alarms, system logging protocol (syslog) messages, Simple Network Management Protocol (SNMP) traps, topology, etc., and stream the data to a message bus. In a typical software deployment, data may be collected (e.g., action 104) by the data collection framework of a suitable program and messages may be pushed to a stream-processing software platform (e.g., root-cause analyzing program 34) and a relational database (e.g., database 30, KeDB 105, etc.).

One embodiment of the present disclosure includes a mechanism (e.g., network interface 28) to facilitate the mining of relevant diagnostics given a set of symptoms, for automating the process of root-cause analysis in a way that can generalize well to accommodate to new types of problems. A first step of the mechanism may include (1) collecting relevant data (e.g., action 104) from the Wi-Fi system (via the network 14) and stream this data to a message bus (e.g., local interface 32) that is connected to the database 30 (or KeDB 105). A second step may include (2) computing the distances (e.g., action 108) of new data (symptoms) to known diagnostics (and diagnostic families) from knowledge stored in the KeDB 105. This computation (i.e., action 108) may use both analytical and Machine Learning (ML) based models. A third step may include (3) calibrating the weight of the distance functions (e.g., action 112) for each diagnostic using ML boosting algorithms. A fourth step of the mechanism may include (4) filtering and ranking the diagnostics (and diagnostic families) (e.g., action 114) to present only relevant diagnostics to the end user. If the diagnostic is specific enough, an optional fifth step (e.g., action 116) may include (5) automatically applying remediation actions to address the issue.

Figure 9:
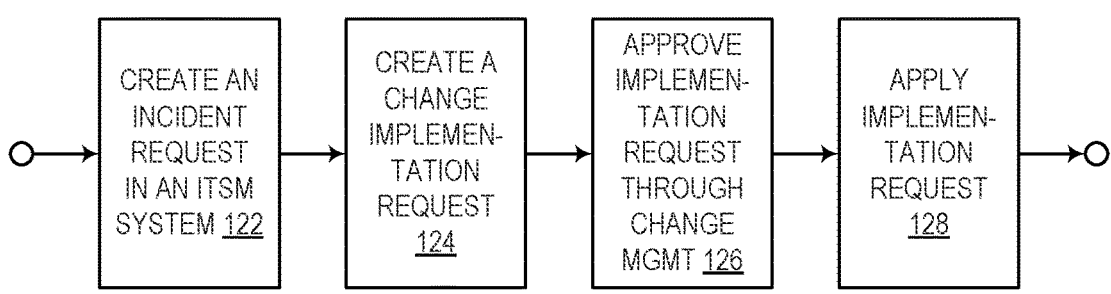
FIG. 9 is a flow diagram illustrating a remediation process for performing remediation in a closed-loop system, according to various embodiments of the present disclosure.

FIG. 9 is a flow diagram illustrating an embodiment of a remediation process 120 (e.g., action 116) for performing remediation in a closed-loop system (e.g., closed-loop system 100). The remediation process 120, according to this embodiment, includes block 122 indicating a step of creating an incident request in an Information Technology (IT) Service Management (ITSM) system. The remediation process 120 also includes creating a change implementation request, as indicated in block 124. Next, the remediation process 120 includes waiting for approval of the implementation request through a change management system, as indicated in block 126. When it is approved, the remediation process 120 includes applying the implementation request, as indicated in block 128.

The ability to automatically remediate issues that were identified in previous steps may be implemented in block 128. Once an inference engine recommends ranked potential root-causes for the generated syslog and alarm events in the system, they will be presented to a user (e.g., network manager, NOC operator, etc.). The operator may then select one action believed to be a reasonable root-cause remediation action and submits it to a workflow management tool. In some embodiments, this approach may include the use of Camunda, although other workflow management tools may be used for workflow automation, as they can be easily reproduced in other frameworks as well. For instance, the workflow shown in FIG. 9 may be automatically kicked off by the NOC operator to fix any of the Wi-Fi authentication failure scenarios described in the present disclosure. The remediation process 120 may be extended in any number of ways depending on real procedures that a NOC operator might normally take to fix the underlying issues.

Figure 10:
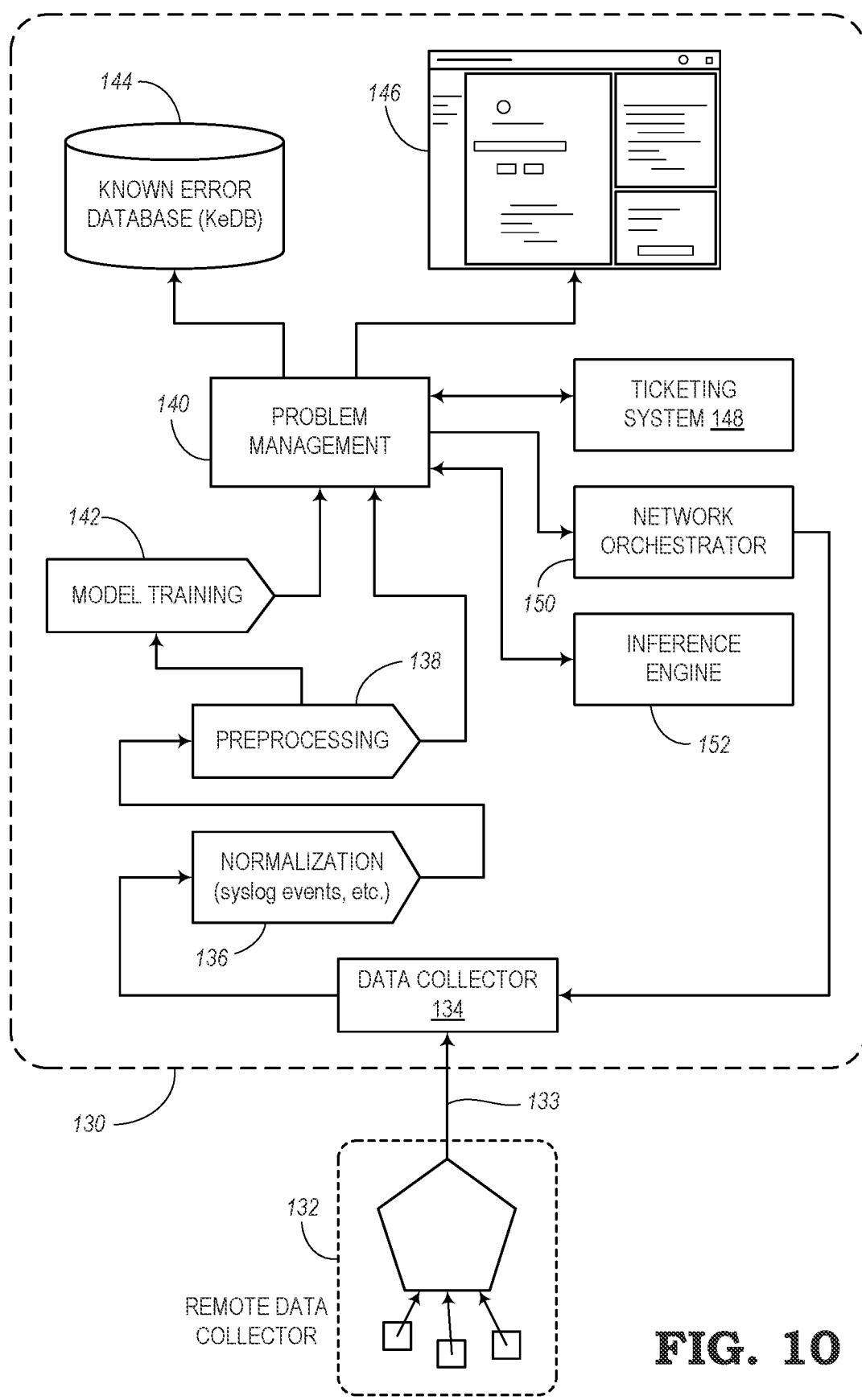
FIG. 10 is a diagram illustrating a system for analyzing root-causes of a network, according to various embodiments of the present disclosure.

FIG. 10 is a diagram showing another embodiment of a system 130 for analyzing root-causes of a network or Wi-Fi system. A data collector may have two parts: 1) a remote data collector 132 (or off-site collector) that connects with the devices in the system 130 to collect data as well as push commands and 2) an on-site data collector 134 that is accessible by other components in the system 130. The two data collection components 132, 134 connect through a site-to-site connection 133 which may have encryption in transit, which may be needed to securely move data across a Firewall boundary.

The system 130 also includes a normalization component 136 configured to parse out the messages coming from the devices and transforms them into a standard format so that they can be consumed by other components in the system 130 in a device-agnostic way. A preprocessing component 138 is configured to convert text and/or key-value data from alarms, syslog data, etc. into features that can be used by a model training component 142 to train ML models. Also, the same pre-processing logic is used to transform data to make predictions about probable root-causes. The preprocessed data and trained model are transmitted from the preprocessing component 138 and model training component 142, respectively, to a problem management component 140. The model training component 142 may be used to train ML models needed for identifying probable root-causes of issues in a Wi-Fi system. In this embodiment, the preprocessing component 138 may be configured to feed pre-processed data into various ML algorithms (e.g., RandomForest, Gradient Boosting, XGBoost, CatBoost) of the model training component 142.

Also, the system 130 includes a Known error Data Base (KeDB) 144 or other type of knowledge database. The KeDB 144 may be implemented in a persistence layer that stores all the information about the known diagnostics. Also, the KeDB 144 may serve as a ML-based known-error database that facilitates root-cause analysis. The KeDB 144 may be pre-populated with various Wi-Fi diagnostics as well other types of diagnostics. It may also store trained ML models that can be readily used to performed inference. Furthermore, the system 130 includes a User Interface (UI) 146 implemented in a presentation layer that gives a user access to the information via any suitable display device (e.g., a Graphical User Interface (GUI)).

The problem management component 140 may be configured to interact with the KeDB 144, preprocessing component 138, model training component 142, and inference engine 152 to perform root-cause analysis and come up with a list of ranked probable root-causes for a given set of symptoms. The problem management component 140 may then use interfaces with a ticketing system 148 and a network orchestrator 150 to push remediation actions to the devices of the Wi-Fi system to complete a closed-loop automation procedure. It may also communicate with the UI component 146 via Representational State Transfer (REST) to facilitate visualization of root-causes and remediation steps.

The ticketing system 148 may be integrated with the problem management component 140 to allow the system 130 to create change requests for making configuration changes on devices of the Wi-Fi system. The network orchestrator 150 may perform management functions. For example, once a root-cause has been identified, the problem management component 140 can apply the corresponding remediation actions to the devices with the help of the network orchestrator 150. Also, the inference engine 152 may provide a service that allows a user to pass a given set of symptoms in the form of a fixed-length feature vector and then it outputs a model prediction. The inference engine 152 may be pre-configured with various Wi-Fi inference engines, such as, for example, one for each diagnostic in the KeDB 144. This enables the performance of inference for all diagnostics instantaneously and allows the system 130 to rank diagnostics for a given set of symptoms.

Data collection by data collectors 132, 134 may include obtaining information of the operational status and various parameters measured from the devices of the Wi-Fi system. Also, data collection may include receiving the data remotely from telemetry devices. The remote data collector 132 may be configured for effective, resilient, and low-latency data collection to thereby allow the system 130 to perform near real-time root-cause analysis.

The remote data collector 132 may be an agent that is present on the premises of a Wi-Fi system being analyzed. In some cases (e.g., with SD-WAN or when using cloud-based VNFs), the agent may be deployed in the cloud. In those cases, the rest of the flow may remain the same, except for the location of the agent. The system 130 is configured to be connected to and receive collected data from different type of devices to obtain performance metrics, Performance Monitoring (PM) data, errors, faults, issues, alarms, syslogs, system events, network topology, etc., from a number of components. The remote data collector 132 may include an out-of-the-box data collection device that may be configured to perform normalization and pre-processing. Messages indicative of the collected data may be passed in a push or pull manner from the remote data collector 132 to the data collector 134 of the system 130.

The normalization device 136 may be configured to use open source components to parse out the messages coming from various remote data collectors 132 and transforms them into a standard format so that it can be consumed by other components in the system 130 in a device-agnostic way. The normalization device 136 may include the normalization of Performance Monitoring (PM) data, operational or functional metrics, alarms, events, faults, errors, issues, or other types of information or symptoms.

The normalized data is passed to the pre-processing component 138, which may be configured to perform feature extraction of the data. The pre-processing component 138 may be configured to convert all messages (e.g., performance metrics, PM data, alarms, syslogs, system events, etc.) into a fixed length feature vector. These messages or vectors are then passed along to the problem management component 140, which may be a processing device (e.g., processing device 22) or other type of controller for controlling various components and devices of the system 130.

The problem management component 140 may be in communication with the KeDB 144, which may be the same as or similar to the database 30 and/or KeDB 105. The KeDB 144 may represent a persistence layer that stores the information about the known diagnostics. For example, the stored information may include diagnostic classes, pre-processing functions, distance functions, calibrated weights, relevant features, etc. The KeDB 144 may serve in a ML-based system that facilitates root-cause analysis.

The problem management component 140 may also be in communication with the inference engine 152. The inference engine 152 may provide a service that allows the system 130 to pass a given set of symptoms in the form of a fixed length feature vector and output a model prediction. In some embodiments, the model prediction may include a distance calculation for determining a distance from a given set of symptoms (i.e., observed network problems) to one or more known diagnostics. The inference engine 152 may rely on a catalog of models to accomplish this. For instance, the inference engine 152 may include loading a given model into an open source inference framework (e.g., mxnet) and feeds it with the input data to produce an inference output. According to some embodiments, the inference outputs may be distance values between symptoms (e.g., network issues) and known diagnostics, where the distance values may include a function, such as $d(\sigma, Ax)$.

The problem management component 140 may be configured to interact with the KeDB 144 and inference engine 152 to trigger the computation of distance functions for all diagnostics. The problem management component 140 may then normalize these distances using weights to come up with a ranking of diagnostics for a given network problem. It may also communicate with the UI component 146 (e.g., via REST APIs, web sockets, or other suitable means) to facilitate visualization of this information. For example, the REST architecture may be configured for operation to provide performance, scalability, simplicity, modifiability, visibility, portability, and reliability. The UI component 146 may be configured on a presentation layer and give user access to the information via any suitable display device, such as a GUI.

The system 130 further includes the network orchestrator 150 in communication with the problem management component 140. Once a root-cause has been identified in the Wi-Fi system, the problem management component 140 can apply the corresponding remediation actions to the devices (or network elements) of the Wi-Fi system (or network) with the help of the network orchestrator 150. The network orchestrator 150 may include the capability to interact with the devices and push any changes needed to fix the one or more root-causes.

Therefore, according to the various embodiments of the present disclosure, the systems and methods have multiple advantages and points of novelty with respect to conventional systems. For example, the present disclosure describes embodiments having the ability to handle mixed data types (e.g., a blend of textual and numeric data) from syslog data, alarms, alerts, etc. using a combination of NLP and ML techniques. Also, the present disclosure provides the above-described combinations to build a novel NLP+ML-based root-cause analysis pipeline for various Wi-Fi error scenarios to identify root-causes with 100% accuracy, precision, and recall.

The embodiments of the present disclosure also have the ability to rank root-causes for Wi-Fi error scenarios and provide confidence (or probability) for each of the probable root-causes. The systems and methods also have the ability to do root-cause analysis in real-time. The present approaches described herein allow the grouping of various Wi-Fi errors into a hierarchical tree structure that enables efficient exploration of specific root-causes (e.g., leaf nodes of a tree) as well as different classes of root-causes (e.g., internal nodes of a tree). Ultimately, these embodiments may be used to help scale up a system horizontally to cater to newer scenarios. Another advantage is the ability of the present embodiments to remediate various root-causes using a sequence of steps that can be fully automated.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. An analysis system comprising:
   a network interface arranged in communication with a Wi-Fi system that is associated with a Local Area Network (LAN);
   a processing device; and
   a memory device configured to store a computer program having instructions that, when executed, enable the processing device to
      monitor the Wi-Fi system to detect authentication failures in the Wi-Fi system,
      in response to detecting an authentication failure in the Wi-Fi system, analyze the authentication failure to determine one or more root-causes of the authentication failure, and
      push changes to the Wi-Fi system to automatically remediate the one or more root-causes in the Wi-Fi system using a closed-loop automation process.

2. The analysis system of claim 1, wherein monitoring the Wi-Fi system includes collecting data in the Wi-Fi system and streaming the data to a message bus.

3. The analysis system of claim 2, wherein the collected data is related to symptoms indicative of issues in the Wi-Fi system, and wherein monitoring the Wi-Fi system includes computing distances between the symptoms and a set of diagnostics, the computed distances corresponding to dissimilarities between the symptoms and each of the diagnostics.

4. The analysis system of claim 3, wherein analyzing the authentication failure to determine the one or more root-causes includes filtering the symptoms based on confidence thresholds to obtain one or more paths and ranking the one or more paths based on the computed distances of the one or more paths.

5. The analysis system of claim 4, wherein pushing the changes to the Wi-Fi system to automatically remediate the one or more root-causes includes remediating a root-cause for a highest-ranked path having the lowest computed distance before remediating one or more other root-causes.

6. The analysis system of claim 1, wherein analyzing the authentication failure in the Wi-Fi system includes utilizing a hierarchical root-cause analysis tree having multiple levels to determine the one or more root-causes.

7. The analysis system of claim 1, wherein automatically remediating the one or more root-causes includes
creating an incident request in an Information Technology Service Management (ITSM) system,
creating a change implementation request, and
upon approval of the change implementation request by a change management system, applying the change implementation request to the Wi-Fi system.

8. The analysis system of claim 1, wherein the Wi-Fi system includes one or more of a user device, an Access Point (AP), a Wireless LAN Controller (WLC), a Network Access Control (NAC) device, a policy manager, and a directory service device.

9. The analysis system of claim 1, wherein monitoring the Wi-Fi system includes obtaining syslog data, pre-processing the syslog data, and applying the pre-processed syslog data to a Machine Learning (ML) training system.

10. The analysis system of claim 9, wherein pre-processing the syslog data includes utilizing one or more text searching techniques.

11. The analysis system of claim 9, wherein the syslog data is related to Performance Monitoring (PM) data, alarms, and syslog messages.

12. The analysis system of claim 1, wherein the authentication failure in the Wi-Fi system includes one or more of a wrong username error, a wrong password error, and a configuration mismatch.

13. The analysis system of claim 1, wherein the LAN is part of an enterprise system.

14. A non-transitory computer-readable medium configured to store computer logic having instructions that, when executed, enable a processing device to:
monitor Wi-Fi system associated with a Local Area Network (LAN) to detect authentication failures in the Wi-Fi system,
in response to detecting an authentication failure in the Wi-Fi system, analyze the authentication failure to determine one or more root-causes of the authentication failure, and
push changes to the Wi-Fi system to automatically remediate the one or more root-causes in the Wi-Fi system using a closed-loop automation process.

15. The non-transitory computer-readable medium of claim 14, wherein monitoring the Wi-Fi system includes collecting data in the Wi-Fi system and streaming the data to a message bus, wherein the collected data is related to symptoms indicative of issues in the Wi-Fi system, wherein monitoring the Wi-Fi system includes computing distances between the symptoms and a set of diagnostics, wherein the computed distances correspond to dissimilarities between the symptoms and each of the diagnostics, wherein analyzing the authentication failure to determine the one or more root-causes includes filtering the symptoms based on confidence thresholds to obtain one or more paths and ranking the one or more paths based on the computed distances of the one or more paths, and wherein pushing the changes to the Wi-Fi system to automatically remediate the one or more root-causes includes remediating a root-cause for a highest-ranked path having the lowest computed distance before remediating one or more other root-causes.

16. A method comprising the steps of:
monitoring a Wi-Fi system associated with a Local Area Network (LAN) to detect authentication failures in the Wi-Fi system,
in response to detecting an authentication failure in the Wi-Fi system, analyzing the authentication failure to determine one or more root-causes of the authentication failure, wherein analyzing the authentication failure in the Wi-Fi system includes utilizing a hierarchical root-cause analysis tree having multiple levels to determine the one or more root-causes, and
pushing changes to the Wi-Fi system to automatically remediate the one or more root-causes in the Wi-Fi system.

17. The method of claim 16, wherein the Wi-Fi system includes one or more of a user device, an Access Point (AP), a Wireless LAN Controller (WLC), a Network Access Control (NAC) device, a policy manager, and a directory service device, wherein monitoring the Wi-Fi system includes obtaining syslog data from the WLC and NAC device, pre-processing the syslog data, and applying the pre-processed syslog data to a Machine Learning (ML) training system, wherein pre-processing the syslog data includes utilizing one or more text searching techniques, and wherein the syslog data is related to Performance Monitoring (PM) data, alarms, and syslog messages.

* * * * *